United States Patent

Milocco et al.

[11] Patent Number: 5,829,459
[45] Date of Patent: Nov. 3, 1998

[54] WASHING MACHINE WITH A MULTI-FUNCTION WATER RESERVOIR

[75] Inventors: Claudio Milocco, Trieste; Gianluca Tassotti; Giovanni Centis, both of Pordenone, all of Italy

[73] Assignee: Electrolux Zanussi Elettrodomestici S.p.A., Pordenone, Italy

[21] Appl. No.: 814,423

[22] Filed: Mar. 10, 1997

[30] Foreign Application Priority Data

Apr. 10, 1996 [IT] Italy ................................ PN96A00021

[51] Int. Cl.$^6$ ..................................................... D06F 39/02
[52] U.S. Cl. ..................... 134/57 D; 134/58 D; 134/201; 68/902
[58] Field of Search ................................ 134/56 D, 57 D, 134/58 D, 200, 201, 103.1; 68/902, 207, 17 R

[56] References Cited

U.S. PATENT DOCUMENTS

| | | | |
|---|---|---|---|
| 2,728,352 | 12/1955 | Sanders | 68/207 |
| 4,641,671 | 2/1987 | Nogi et al. | 134/57 D |
| 5,017,852 | 5/1991 | Nagata et al. | 134/58 D |
| 5,241,843 | 9/1993 | Hein | 68/207 |
| 5,285,665 | 2/1994 | Hetrick, Jr. | 68/902 |
| 5,307,650 | 5/1994 | Mertz | 68/902 |
| 5,501,792 | 3/1996 | Carroll, Jr. | 68/207 |
| 5,606,878 | 3/1997 | Arreghini et al. | 68/902 |
| 5,617,885 | 4/1997 | Centis | 68/902 |
| 5,660,193 | 8/1997 | Archer et al. | 134/58 D |

FOREIGN PATENT DOCUMENTS

| | | | |
|---|---|---|---|
| 287990 | 10/1988 | European Pat. Off. . | |
| 669097 | 8/1995 | European Pat. Off. . | |
| 2910140 | 9/1980 | Germany | 68/902 |
| 53-9064 | 1/1978 | Japan | 134/58 D |
| 60-2279 | 1/1985 | Japan | 68/902 |
| 63-64236 | 12/1988 | Japan | 68/207 |
| 2139083 | 11/1984 | United Kingdom | 134/58 D |

*Primary Examiner*—Frankie L. Stinson
*Attorney, Agent, or Firm*—Pearne, Gordon, McCoy & Granger LLP

[57] ABSTRACT

A dishwashing machine having a reservoir (6) communicating with the washing tank (1) through a lower aperture (7) connected to the delivery side of a drain pump (3). The reservoir (6) comprises an upper aperture (9) capable of communicating with the outside ambient through a valve (10) which is controlled by the program sequence control switch (13) of the machine so as to open during a predetermined water discharge phase to enable the reservoir (6) to be filled by the water being let out from the tank (1); to temporarily close so as to prevent said reservoir (6) from emptying after said water discharge phase; and to finally open again so as to enable the water stored in the reservoir (6) to flow back into the washing tank (1), through the lower aperture (7) and the pump (3), to be used during said subsequent phase of the washing process.

9 Claims, 1 Drawing Sheet

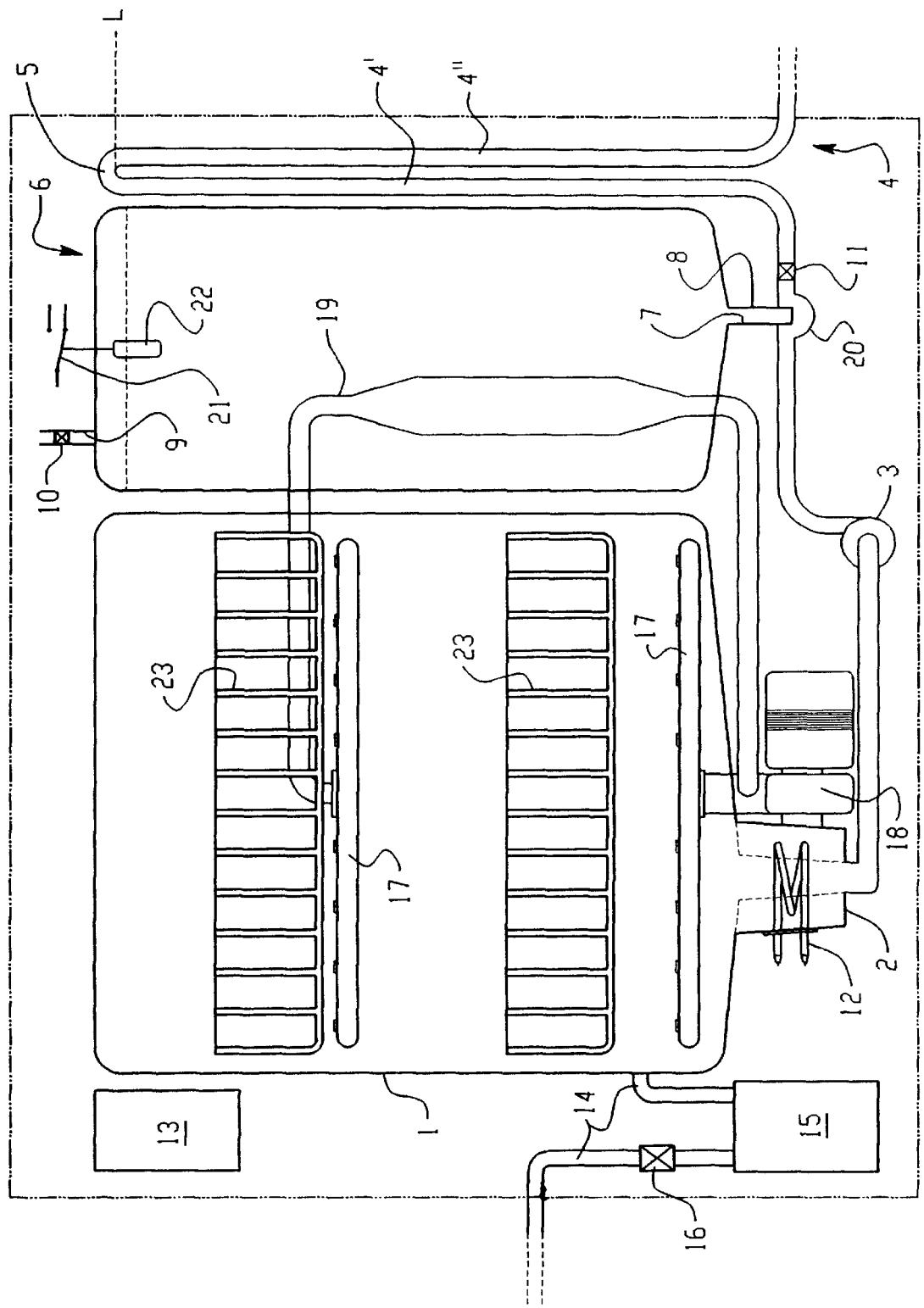

WASHING MACHINE WITH A MULTI-FUNCTION WATER RESERVOIR

BACKGROUND OF THE INVENTION

The present invention relates to a washing machine provided with a multi-function water reservoir adapted to enable water and, possibly, heat to be recovered in view of reaching an overall energy saving effect.

Dishwashing machines are known, as disclosed for instance by EP-A-0 669 097, that are provided with a reservoir adapted to store water from a final rinse phase for use again as process water in a washing phase of a subsequent washing cycle.

Arrangements for use in conjunction with clothes washing machines are also known, as for instance disclosed in EP-A-0 287 990, in which not only water, but also the heat of previously heated water can be recovered. In particular, the heat of hot water being discharged, being sent to an outlet of the machine, can be transferred by means of a heat exchanger to the fresh water being filled in a washing machine for carrying out a subsequent washing cycle.

However, all such prior art solutions for recovering water and/or hear are undesirably complicated and unreliable, mainly due to a large number of actuators and related control means required to control the operation of at least a water storage reservoir and the energy recovery system associated thereto.

BRIEF SUMMARY OF THE INVENTION

It is, therefore, a main purpose of the present invention to provide a washing machine having a multi-function water reservoir adapted to perform an effective energy recovery, in particular a water recovery and, possibly, heat recovery duty, in a simple manner.

A further purpose of the present invention is to provide a washing machine of the above-cited kind, which has a construction and a structure which is particularly simple and reliable and, at the same time, is very versatile in its operation.

According to the invention, these aims are reached in a washing machine with a multi-function water reservoir incorporating the characteristics as recited in the appended claims.

BRIEF DESCRIPTION OF THE SEVERAL VIEWS OF THE DRAWING

The characteristics and the advantages of the present invention will be more readily understood from the description which is given below by way of non-limiting example. The description is given with reference to the accompanying drawing, in which the single FIGURE is a schematical view of the main component parts of the washing machine according to a preferred embodiment of the present invention.

DETAILED DESCRIPTION OF THE INVENTION

Referring to the FIGURE, a washing machine, preferably a dishwashing machine of the domestic type, has a washing tank 1 provided in its bottom portion with a water collecting pump 2. The water is capable of being heated by means of an electric heating element 12, or similar means, controlled by a program sequence control switch 13.

In a known manner, the washing tank 1 houses at least one rotating spray arm 17 adapted to be supplied by a circulation pump 18, through at least one connection conduit or piping 19, with water taken from the sump 2 in view of spraying such water onto washload items that are arranged in an appropriate basket 23.

The sump 2 communicates with the suction side of a drain pump 3, the delivery side of which is connected to a drain conduit 4. In a preferable manner, the drain conduit 4 has a siphon-trap type arrangement with an upwards sloping section 4' and a downwards sloping section 4". Therefore, the drain conduit 4 is provided with an overflow device 5 having a pre-determined spilling level L.

The dishwashing machine is further provided with at least one reservoir 6 arranged preferably outside the washing tank, for example, in a hollow space provided between the washing tank and the outer casing (shown in phantom) of the machine. This reservoir 6 has a substantially closed construction and includes at least one lower aperture 7 through which the reservoir communicates with the washing tank 1. In particular, according to one feature of the invention, the lower aperture 7 of the reservoir 6 is connected by a pipe 8 to the delivery side of the drain pump 3, through which the reservoir communicates with the washing tank. In a preferred manner, the pipe 8 comprises a siphon-trap type arrangement 20, to prevent the reservoir 6 from unduly self-emptying, as will be explained below. Furthermore, downstream of the connection of the delivery side of the pump 3 with the pipe 8 there is preferably provided a non-return or similar check valve 11 in the drain conduit 4.

The reservoir 6 further includes at least one upper aperture 9 adapted to communicate with the outside ambient air through valve means, such as for instance an appropriate electromagnetic valve 10, controlled by the program sequence control switch 13 of the machine.

In a preferred manner, the upper aperture 9 is situated at a level at least equal to the aforementioned spilling or overflow level L. Alternatively, regardless of the position of said upper aperture 9, the valve 10 is situated at a level which is at least equal to the spilling or overflow level L.

In a known manner, the washing tank 1 is capable of being supplied with water from the mains in view of carrying out, as controlled by the program sequence control switch 13, operation cycles including at least one washing phase and/or at least one rinsing phase. To this purpose, the machine comprises a water fill conduit 14 provided with a water softener arrangement 15 (with an associated hydraulic regeneration circuit of a known type not shown here) and an electromagnetic water fill valve 16 controlled by said program sequence control switch 13.

As it will be explained in greater detail further on, the reservoir 6 is adapted to store at least a part of the water from at least one of the above-cited process phases in view of reusing it during a subsequent process phase. The general operating mode of the machine is therefore substantially known, so that only the novel operating characteristics and features of the machine according to the present invention will be described below by way of non-limiting example.

To this purpose, let us assume that the dishwashing machine has carried out a rinsing phase in which the washload items have been rinsed in a substantially traditional phase, so that the water collecting sump 2 is full of preferably heated water. Furthermore, the valve 10 is closed and, as a result, as this will be more readily understood further on, the reservoir 6 is substantially full of air.

The rinsing phase is followed by a water drain phase determined by the energization of the pump 3 which tends to send toward the outlet 4, through the non-return valve 11, the water contained in the sump 2. According to a feature of the invention, during such a drain phase the program sequence control switch 13 causes the valve 10 (and, as a result, the aperture 9 of the reservoir) to open, so that at least a part of the water under pressure at the delivery side of the pump 3 is free to flow into the reservoir 6 through the pipe 8 and the lower aperture 7.

It should be noticed that such an opening of the valve 10 can preferably take place at the beginning of the drain phase, when the upwards sloping section 4' of the drain conduit is substantially full of residual water due to the presence of the non-return valve 11, The water under pressure at the delivery side of the pump 3 therefore finds a preferential flow-path through the aperture 7 of the reservoir 6, as long as the pressures in the drain conduit 4 and the reservoir 6 do not become equivalent.

During the drain phase at least a part of the water removed from the collecting sump 2 flows to substantially fill up the reservoir 6, which preferably has a capacity corresponding to at least the volume of the water discharged during said drain phase. It will of course be appreciated that such a filling of the reservoir 6 is enabled not only by the operation of the pump 3 and the opening of the valve 10 (which allows air to be vented outside), but also by the fact that the drain conduit 4 has an overflow or spilling level L, as this has been described above. On the other hand, the overflow arrangement 5 allows any possible excess water to be discharged, so that it effectively and advantageously prevents water from flowing out through the upper aperture 9 of the reservoir 6.

At the end of the drain phase, preferably immediately before the pump 3 is de-energized, the program control switch 13 commands the valve 10 to close temporarily, so that the reservoir 6 starts to behave like a bell, or pressure accumulator, having its top portion sealed hermetically. As a result, when the pump 3 does not operate, the water stored in the reservoir 6 will remain trapped and confined there due to negative pressure effect, so that it will be unable to flow out through the lower aperture 7 which, to this purpose, is preferably associated to the siphon-trap arrangement 20 of the pipe 8, as has already been illustrated.

It should be noticed that, as long as the valve 10 stays in its closed state for the recovered water to be stored in the reservoir 6, the operation of the dishwashing machine can go on to carry out other functions in a traditional manner. For instance, the pump 3 may be operated, without involving or affecting the water stored in the reservoir 6, to discharge, that is, to send to the outlet 4, the water that has been used for traditionally "flushing" the ion-exchange resins of the water softener 15. In fact, the water sent to the outlet 4 and the water stored in the reservoir 6 remain substantially separated dynamically from each other thanks to the presence of the siphon-trap arrangement 20 which is provided in correspondence of the bottom on the reservoir 6.

According to the present invention, the reservoir 6 will only be able to be emptied when the program sequence control switch 13, for instance in view of carrying out a washing phase in a subsequent operating cycle of the machine, commands the valve 10 to re-open, thereby enabling air to flow into the reservoir 6 through the upper aperture 9 thereof. The water that had been previously stored in the reservoir 6 can therefore flow by gravity back into the washing tank 1, in particular into the sump 2, through the lower aperture 7, the associated pipe 8 and the pump 3, which is not operating in this moment.

In this manner, substantially clean water can be practically recovered in view of it being reused to carry out a subsequent process or operating phase. This is a known feature, as this has already been explained. The present invention provides for control of the phases of filling the reservoir 6 with recovered water, keeping the recovered water duly stored in said reservoir 6, and reusing the same water in a subsequent operating or process phase of the machine, by making use of a single electromagnetic valve 10, or similar means, which is simply actuated by the program sequence control switch of the machine in combination with the drain pump 3. A particularly advantageous feature is furthermore given by the fact that said valve 10 never enters into contact with the water and, as a result, with soil particles that can impair its correct operation. Therefore, the entire washing machine according to the present invention is particularly simple, reliable and cost-effective.

It will of course be appreciated that the aforedescribed washing machine may undergo a number of modifications without departing from the scope of the present invention.

For instance, as either an alternative or an addition to the aforedescribed operation of the machine, the possibility arises for water to be recovered by any different process or operating phase of the machine in view of re-using it in any different process or operating phase carried out by the machine subsequently, according to the actual needs. To this purpose, the program sequence control switch 13 of the machine is set so that it will command the valve 10 to be actuated in the aforedescribed manner in corresponding periods or moments of the operating cycle being performed and/or subsequent operating cycles. Setting the program sequence control switch in such a manner is an operation which is within the ability of anyone skilled in the art.

According to another feature of the present invention, at least part of the piping 19 associated to the rotating spray arm 17 is in a heat-exchange relation with the reservoir 6. For instance, the piping 19 may be arranged so as to run in close contact with the reservoir 6. This embodiment of the invention may prove particularly advantageous in a domestic dishwashing machine of the traditional type adapted to perform at least a rinsing phase with cold water between a washing phase and a final rinsing phase carried out with heated-up water. As generally known, such a final hot-water rinsing phase is also aimed at heating the washload items in view of enabling them to more effectively dry up subsequently.

In particular, in such an embodiment the program sequence control switch 13 can be set to actuate the valve 10, in a manner similar to the aforedescribed one, so as to enable at least a part of the heated water used in a washing used in a washing phase to be stored in the reservoir 6. As a result, the cold water supplying the rotating spray arm 17 during one or more subsequent rinsing phases is heated, while flowing through the piping 19, by exchanging heat with the hot water stored in the reservoir 6. Such a heating effect would correspondingly reduce the amount of thermal energy required to heat up the washload items during the final rinsing phase. It will be possible for the washing water so stored in the reservoir 6 to be sent back to the tank 1 and, then, to the outlet 4 in any appropriate period or moment, for example, before the hot-water rinsing phase. This would enable the reservoir 6 to be ready to temporarily recover and store also the hot water from said rinsing phase, as this has been described previously.

A similar thermal energy recovery effect may be obtained by arranging the reservoir 6 in a heat-exchange relation with the washing tank 1, for example, by arranging said reservoir in close contact with said tank.

According to a further feature of the present invention, the multi-function reservoir 6 may be used also to perform a volumetric (and therefore advantageously accurate) control of the water being filled into the tank 1 at the beginning of each operating phase, although the same reservoir 6 is not actually a part of the water supply circuitry 14–16 of the machine. To such an aim, the reservoir 6 is provided with a simple level control arrangement adapted to cause the electromagnetic water-inlet valve 16 to close when the water in the reservoir reaches up to a predetermined level corresponding to the desired volume of water. Such a level control arrangement may be for instance of the type comprising a pressure switch or even a micro-switch 21 controlled by a float 22, as this is described in the aforecited EP-A-0 669 097.

In a preferred embodiment, in order to carry out a water filling phase the program sequence control switch 13 commands the electromagnetic valve 16 to pen and then (at least in the final part of the water filling phase) causes the valve 10 to open and at the same time energizes the drain pump 3. The water filled into the tank 1 collects therefore in the reservoir 6 as this has been described previously. When the water in the reservoir 6 reaches up to the aforecited predetermined level, the level control arrangement 21, 22 causes (through the program sequence control switch 13) the electromagnetic water-inlet valve 16 to close and the drain pump 3 to be de-energized. As a result, since the valve 10 is open, the water collected in the reservoir 6 is able to flow back into the sump 2 by passing through the aperture 7, the pipe 8 and the pump 3, as this has already been described. At this point, the valve 10 can be closed again in order to restore the machine in its most appropriate operating state.

It will be appreciated that the washing machine may be of a different type, such as for instance a clothes washing machine.

What is claimed is:

1. A washing machine comprising a washing tank capable of being supplied with water; a drain conduit connected to the washing tank; a pump connected in the drain conduit; a sequence control switch controlling operating cycles including at least one washing or rinsing phase and at least one water drain phase; at least one reservoir having a lower aperture communicating with the tank and adapted to store at least a part of the water from at least one of said operating phases for re-utilization thereof during a subsequent operating phase of the machine, characterized in that:

said lower aperture (7) of the reservoir (6) is connected to a delivery side of the pump (3) through which the lower aperture communicates with the tank (1);

the reservoir includes at least one upper aperture (9) adapted to communicate with outside ambient air through valve means (10); and said valve means (10) is controlled by the program sequence control switch (13) so as to open during at least a pre-determined drain phase to enable said reservoir (6) to be substantially filled with water being let out of the tank (1), to temporarily close to prevent the water stored in the reservoir (6) from escaping therefrom after said drain phase, and to open again so as to enable the water stored in the reservoir (6) to flow back into the washing tank (1) through said lower aperture (7) and said pump (3) for said subsequent operating phase to be carried out.

2. A washing machine according to claim 1, characterized in that the drain conduit (4) includes an overflow arrangement (5) having a pre-determined overflow level (L), said upper aperture (9) of the reservoir (6) being situated at a level which is at least as high as said pre-determined overflow level (L).

3. A washing machine according to claim 1, characterized in that the drain conduit (4) includes an overflow arrangement (5) having a pre-determined level (L), said valve means (10) being situated at a level which is at least as high as said pre-determined overflow level (L).

4. A washing machine according to claim 1, characterized in that said reservoir (6) has a capacity which is at least equal to the volume of water discharged from the washing tank (1) during said drain phase.

5. A washing machine according to claim 1, characterized in that the drain conduit (4) comprises, downstream of the connection between the lower aperture (7) of the reservoir (6) and the delivery side of the pump (3), non-return valve means (11).

6. A washing machine according to claim 1, characterized in that said lower aperture (7) of the reservoir (6) is connected to the delivery side of the pump (3) through a pipe (8) comprising a siphon-trap arrangement (2) adapted to substantially prevent the water stored in the reservoir (6) from escaping therefrom.

7. A washing machine according to claim 1, characterized in that said reservoir (6) is in a heat-exchange relation with the washing tank (1).

8. A washing machine according to claim 1, wherein the washing tank houses means that are adapted to spray onto the washload items water being circulated through a connecting conduit, characterized in that at least a portion of said connecting conduit (19) is in a heat-exchange relation with said reservoir (6).

9. A washing machine according to claim 1, wherein the program sequence control switch (13) is adapted to control at least one water filling phase by commanding a water inlet valve (16) of a water-supply conduit (14) connected to the tank (1) to open, characterized in that the program sequence control switch (13) is adapted to command said valve means (10) to open and said pump (3) to be energized at least during a final part of said water filling phase, and to further command said water inlet valve (16) to close and said pump (3) to be de-energized when the water in the reservoir (6) reaches up to a pre-determined level, so that the water in the reservoir can then flow back into the tank (1) in a volumetrically metered quantity.

\* \* \* \* \*